United States Patent
Bansal et al.

(10) Patent No.: US 11,425,140 B1
(45) Date of Patent: Aug. 23, 2022

(54) SECURE AND EFFICIENT CROSS-SERVICE SHARING OF SUBSCRIBER DATA

(71) Applicant: Amazon Technologies, Inc., Seattle, WA (US)

(72) Inventors: Tanya Bansal, Seattle, WA (US); Veeraraghavan Vijayaraj, Seattle, WA (US); Ravikanth Repaka, Seattle, WA (US); William Frederick Hingle Kruse, Seattle, WA (US); Rodolfo Flores Hinojosa, Seattle, WA (US); Rajesh Viswanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 731 days.

(21) Appl. No.: 15/608,658

(22) Filed: May 30, 2017

(51) Int. Cl.
*H04L 9/40* (2022.01)
*H04L 67/51* (2022.01)
*H04L 41/0803* (2022.01)
*G06F 21/62* (2013.01)

(52) U.S. Cl.
CPC ........ *H04L 63/105* (2013.01); *G06F 21/6218* (2013.01); *H04L 41/0803* (2013.01); *H04L 63/101* (2013.01); *H04L 67/16* (2013.01)

(58) Field of Classification Search
CPC . H04L 63/105; H04L 63/101; H04L 41/0803; H04L 67/16; H04L 63/102; H04L 63/10; G06F 21/6218
See application file for complete search history.

(56) References Cited

U.S. PATENT DOCUMENTS

| 7,590,564 | B1 * | 9/2009 | Ward | G06Q 10/08 705/26.1 |
| 7,603,107 | B2 * | 10/2009 | Ratert | H04W 12/00403 455/414.1 |
| 7,680,491 | B2 * | 3/2010 | Zabawskyj | H04W 76/15 455/417 |
| 7,680,905 | B1 * | 3/2010 | Roberts | H04L 41/0846 709/220 |
| 7,822,439 | B2 * | 10/2010 | Teicher | H04M 1/7253 455/41.2 |
| 8,510,808 | B2 * | 8/2013 | McNeil | H04L 63/08 726/5 |

(Continued)

*Primary Examiner* — Saleh Najjar
*Assistant Examiner* — Devin E Almeida
(74) *Attorney, Agent, or Firm* — Lee & Hayes, P.C.

(57) ABSTRACT

A configuration management service provides data identifying its subscribers to a secure sharing service that executes in an account that has a higher security level than a service account used to provide the configuration management service. The secure sharing service securely determines whether each subscriber has authorized producer services to share resource configuration data with the configuration management service. If a subscriber has authorized such sharing, information identifying the subscriber can be stored in a location accessible to the producer services. If a subscriber has not authorized such sharing, the secure sharing service will not make the subscriber's information available to the producer services. The producer services can use the subscriber data to provide resource configuration data to the configuration management service only for those subscribers that subscribe to both the configuration management service and to the producer services.

20 Claims, 8 Drawing Sheets

(56) References Cited

U.S. PATENT DOCUMENTS

| | | | | |
|---|---|---|---|---|
| 8,789,204 | B2* | 7/2014 | Helander | G06F 21/51 |
| | | | | 715/240 |
| 9,258,744 | B2* | 2/2016 | Mascarenhas | H04W 72/0446 |
| 9,807,073 | B1* | 10/2017 | Miller | G06F 21/6218 |
| 9,955,332 | B2* | 4/2018 | Raleigh | H04M 15/00 |
| 10,084,818 | B1* | 9/2018 | Roth | H04L 63/20 |
| 10,505,912 | B2* | 12/2019 | Assali | G06F 21/36 |
| 10,880,159 | B1* | 12/2020 | Khoo | H04L 41/0803 |
| 2004/0210767 | A1* | 10/2004 | Sinclair | H04L 63/0869 |
| | | | | 726/6 |
| 2008/0250408 | A1* | 10/2008 | Tsui | H04L 67/16 |
| | | | | 718/100 |
| 2010/0311391 | A1* | 12/2010 | Siu | H04W 8/205 |
| | | | | 455/411 |
| 2017/0019455 | A1* | 1/2017 | Tiwari | H04L 63/102 |
| 2017/0064550 | A1* | 3/2017 | Sundaresan | H04L 63/105 |
| 2017/0331832 | A1* | 11/2017 | Lander | H04L 63/0807 |
| 2017/0359345 | A1* | 12/2017 | Gan | H04L 63/0281 |
| 2018/0183802 | A1* | 6/2018 | Choyi | H04L 63/101 |
| 2019/0306138 | A1* | 10/2019 | Carru | H04L 63/0807 |

* cited by examiner

SECURE AND EFFICIENT CROSS-SERVICE SHARING OF SUBSCRIBER DATA

BACKGROUND

Configuration management services can provide functionality for allowing system administrators to monitor computing resources for changes to the configurations of the computing resources. In order to provide this functionality, configuration management services must obtain configuration data that describes the configurations of the monitored computing resources. It can, however, be difficult for network services that provide configuration data (which might be referred to herein as "producer services") to identify those users (who might be referred to herein as "subscribers" or "customers") for which configuration data should be provided to the configuration management service. As a result, producer services might provide configuration data to the configuration management service for computing resources associated with all of their subscribers. This can, however, create a significant security risk, as a security breach of the configuration management service would compromise data for all of the subscribers of the producer services, even those subscribers that are not also subscribers of the configuration management service.

The disclosure made herein is presented with respect to these and other considerations.

DETAILED DESCRIPTION

Figure 1:
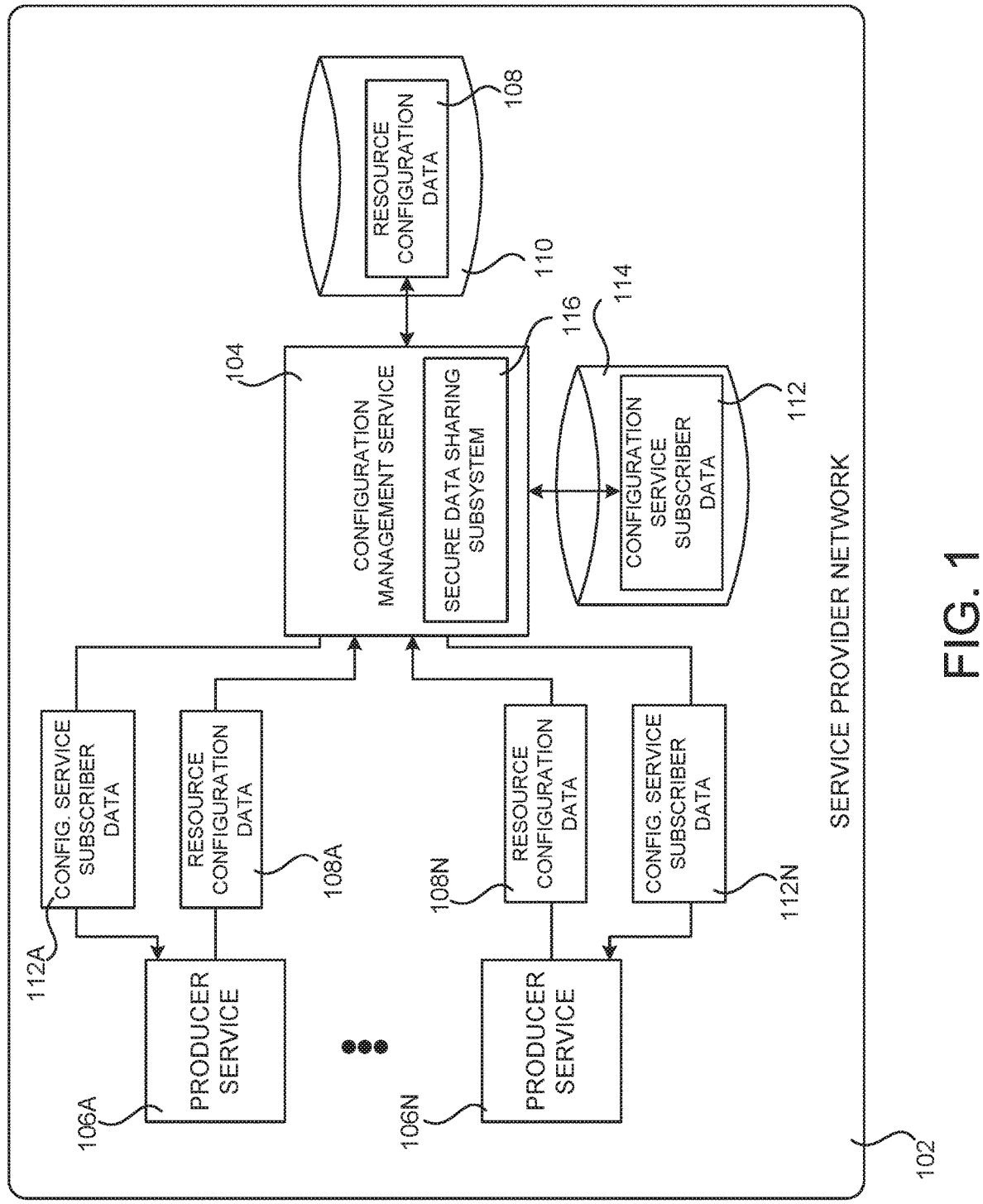
FIG. 1 is a computer system architecture diagram showing aspects of the configuration and operation of a configuration management service capable of secure and efficient cross-service sharing of subscriber data, according to one particular embodiment.

The following detailed description is directed to technologies for secure and efficient cross-service sharing of subscriber data. Through an implementation of these technologies, subscriber data can be shared between a configuration management service and producer services that generate and provide resource configuration data to the configuration management service in a way that reduces the number of affected subscribers in the event of a security breach of the configuration management service. In addition to increased security, embodiments of the disclosed technologies also reduce the use of network bandwidth, storage space, and processor cycles because resource configuration data for subscribers that do not subscribe to both the configuration management service and the producer services is not transmitted to the configuration management service and is therefore also not stored or processed by the configuration management service. Technical benefits other than those specifically identified herein can also be realized through an implementation of the disclosed technologies.

According to one particular embodiment disclosed herein, a configuration management service provides functionality for storage and retrieval of resource configuration data for computing resources operating in a service provider network. The resource configuration data defines the configuration of computing resources. The configuration management service can use the resource configuration data to, among other things, notify subscribers that the configuration of their computing resources has changed. Producer services, which are commonly network services that provide the computing resources for use by the subscribers, provide the resource configuration data for computing resources associated with subscribers to the configuration management service.

In order to identify those subscribers for which producer services are to share resource configuration data with the configuration management service, the configuration management service can provide data identifying its subscribers to a secure sharing service that executes in an account that has a higher level of security and is, therefore, more secure than the service account used to provide the configuration management service. The secure sharing service securely determines whether each subscriber has authorized producer services, which provide resource configuration data to the configuration management service for subscriber's computing resources, to share data with the configuration management service.

If a subscriber has authorized such sharing by the configuration management service, information identifying the subscriber can be stored in a location accessible to the producer services. If a subscriber has not authorized such sharing by the configuration management service, the secure sharing service will not make the subscriber's information available to the producer services. The producer services can then retrieve the subscriber data, and utilize the data to provide resource configuration data to the configuration management service only for those subscribers that subscribe to both the configuration management service and to the producer services.

While the embodiments disclosed herein are presented primarily in the context of sharing subscriber data between a configuration management service and one or more producer services, the technologies disclosed herein can be utilized to securely share other types of data between other types of services in other embodiments. Additional details regarding the configuration and operation of the various components and processes described briefly above will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

FIG. 1 is a computer system architecture diagram showing aspects of the configuration and operation of a configuration management service 104 capable of secure and efficient cross-service sharing of subscriber data, according to one particular embodiment. In the disclosed embodiment, the configuration management service 104 executes in a service provider network 102. The service provider network 102 is a distributed network through which customers and/or other users can utilize computing resources (not shown in FIG. 1) such as VM instances, data storage resources, and/or other types of computing resources, on a permanent or as-needed basis.

Each type or configuration of a computing resource can be available from the service provider network 102 in different sizes. For example, a service provider network 102 can offer physical hosts, VM instances or other types of data processing resources that are available for purchase and use that have many different configurations of processor capabilities, main memory, disk storage, and operating system. A service provider network 102 can also offer other types of computing resources for purchase and use by users.

For example, a service provider network 102 can offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, VM instances and images, security groups, option groups, gateways, option sets, network access control lists ("ACLs"), subnets, storage buckets, network interfaces, snapshots, spot market requests, and storage volumes.

The service provider operating the service provider network 102 can also charge a fee for utilization of the computing resources to a customer that creates and uses the resources. The fee charged for a particular computing resource can be based upon the type and/or configuration of the computing resource. For example, in the case of a data processing computing resource, like a VM instance, the fee for use of the computing resource can be charged based upon the amount of time the computing resource is utilized. In the case of a data storage computing resource, the fee can be computed based upon the amount of data stored and/or the amount of data transferred into or out of the computing resource. The fees for other types of computing resources can also be based upon other considerations. A service provider can also utilize various purchasing models to determine the amount to charge a customer for use of computing resources provided by the service provider network 102.

The computing resources described above can be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks ("WANs"), such as the Internet. Additional details regarding the configuration of a data center for implementing the functionality disclosed herein will be provided below with regard to FIGS. 5 and 6.

The computing resources described briefly above can also be provisioned and de-provisioned as needed in an automated fashion. For example, the service provider network 102 can be configured to instantiate a new instance of a computing resource, such as a VM instance, in response to an increase in demand for a network service or other condition. Other types of computing resources can also be provisioned and de-provisioned in a similar manner. Network services in the service provider network 102 can also provide functionality for automatically scaling and/or de-scaling resources based upon demand for the computing resources 106A-106N and/or other factors.

A customer or potential customer of the service provider network 102 can utilize an appropriate computing system to communicate with the service provider network 102 over an appropriate data communications network (not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102 can be utilized to purchase computing resources in the service provider network 102, to configure aspects of the operation of the computing resources through a management console that provides a graphical user interface ("GUI") for managing resources, or other type of interface, to access and utilize functionality provided by the various services and computing resources described herein, and/or to perform other types of functionality with regard to the operation of the computing resources provided by the service provider network 102.

The computing device utilized to access the service provider network 102 might be any type of computing device capable of connecting to the service provider network 102 via a suitable data communications network such as, but not limited to, a laptop or desktop computer, a smartphone or tablet computing device, a server computer, or a mobile telephone. Administrative users employed by the operator of the service provider network 102, such as administrators managing the operation of the service provider network 102, can also connect with, manage, and utilize computing resources 106A-106N provided by the service provider network 102 in a similar fashion.

As discussed briefly above, the service provider network 102 can also be configured to provide various types of network services for use internally and by customers. For example, and without limitation, the service provider network 102 can provide an on-demand computing service for providing VM instances on-demand, a data storage service for storing data, a cryptography service, a database service, a notification service, an access control service, a policy management service, and, potentially, other types of network-accessible services. These and other services and their associated computing resources can be utilized together to implement various types of network-based applications in the service provider network 102. Additional details regarding one implementation of the service provider network 102 and several types of network services that can be provided by the service provider network 102 will be discussed below with regard to FIGS. 5-8.

Each of the computing resources operating in the service provider network 102 can have associated resource configuration data 108 (which might also be referred to herein as "configuration data"). The configuration data 108 for a computing resource includes data describing how the computing resource is to be configured. For example, and without limitation, the configuration data 108 for a computing resource operating in the service provider network 102 can define the software configuration, hardware configuration, network configuration, and/or another type of configuration for the computing resource.

As discussed briefly above, the service provider network 102 can also be configured with a configuration management service 104. According to one particular embodiment disclosed herein, the configuration management service 104 provides functionality for storage and retrieval of resource configuration data 108 for computing resources operating in the service provider network 102. The configuration management service 104 can use the resource configuration data 108 to, among other things, notify users of the configuration management service 104 that the configuration of their computing resources has changed. The configuration management service 104 can utilize the resource configuration data 108 for other purposes in other embodiments.

Other network services (which might be referred to herein as "producer services 106") operating within the service provider network 102 generate the resource configuration data 108 and provide the resource configuration data 108 to the configuration management service 104. The configuration management service 104 stores the resource configuration data 108 in an appropriate data store 110, such as that provided by a storage service or a database service also operating in the service provider network 102. The resource configuration data 108 can be stored as records that identify the subscribers to the configuration management service 104 along with data identifying the configuration of their associated computing resources in the service provider network 102. Configuration service subscriber data 112 (which might be referred to herein as simply "subscriber data 112") includes records identifying the subscribers of the configuration management service 104 can also be stored in an appropriate data store 114.

The producer services 106 can be network services that provide computing resources for use by customers of the service provider network 102. For example, and without limitation, the producer service 106A might be an on-demand computing service that provides VMs on demand. In this example, the resource configuration data 108A might include data describing the configuration (e.g. a software inventory or a network configuration) of a VM that has been instantiated for a user of the on-demand computing service. In another example, the producer service 106N might be a network resource, such as a load balancer. In this example, the resource configuration data 108N includes data describing the configuration of the load balancer. Other types of network services that can act as producers of resource configuration data are described below with regard to FIG. 7.

In order for the producer services 106 to provide the resource configuration data 108 to the configuration management service 104, the producer services 106 need to have data identifying the subscribers of the configuration management service 104 for which resource configuration data 108 is to be provided. It can, however, be difficult for producer services 106 to identify those users for which configuration data 108 should be provided to the configuration management service 104 in a secure manner. As a result, the producer services 106 might provide resource configuration data 108 to the configuration management service 104 for computing resources associated with all of their subscribers.

The configuration management service 104 can delete the resource configuration data 108 for subscribers of the producer services 106 that are not also subscribers of the configuration management service 104. Storage of the resource configuration data 108 even for a short period of time can, however, create a significant security risk, as a security breach of the configuration management service 104 would compromise data for all of the subscribers of the producer services 106, even those subscribers that are not also subscribers of the configuration management service 104.

In order to address the considerations set forth above, and potentially others, the configuration management service 104 utilizes a secure data sharing subsystem 116 in some embodiments. Through the use of the secure data sharing subsystem 116, the configuration management service 104 can share configuration service subscriber data 112 identifying its subscribers with the producer services 106 in a secure manner. In the example shown in FIG. 1, for instance, the configuration management service 104 has transmitted the configuration service subscriber data 112A and 112N to the producer services 106A and 106N, respectively.

The producer services 106 can receive the configuration service subscriber data 112, and utilize the subscriber data 112 to provide resource configuration data 108 to the configuration management service 104 only for those subscribers that subscribe to both the configuration management service 104 and to the producer services 106. In the example shown in FIG. 1, for instance, the producer service 106A has provided the resource configuration data 108A to the configuration management service 104 and the producer service 106N has provided the resource configuration data 108N to the configuration management service 104. The configuration management service 104 stores the resource configuration data 108A and 108N in the data store 110.

The configuration management service 104 can then utilize the configuration data 108 in the manner described above such as, for instance, to provide a notification to a subscriber when the configuration of one of their computing resources changes. Additional details regarding the configuration and operation of the secure data sharing subsystem 116 for securely sharing configuration service subscriber data 112 with the producer services 106 will be provided below with regard to FIGS. 2-4.

Figure 2:
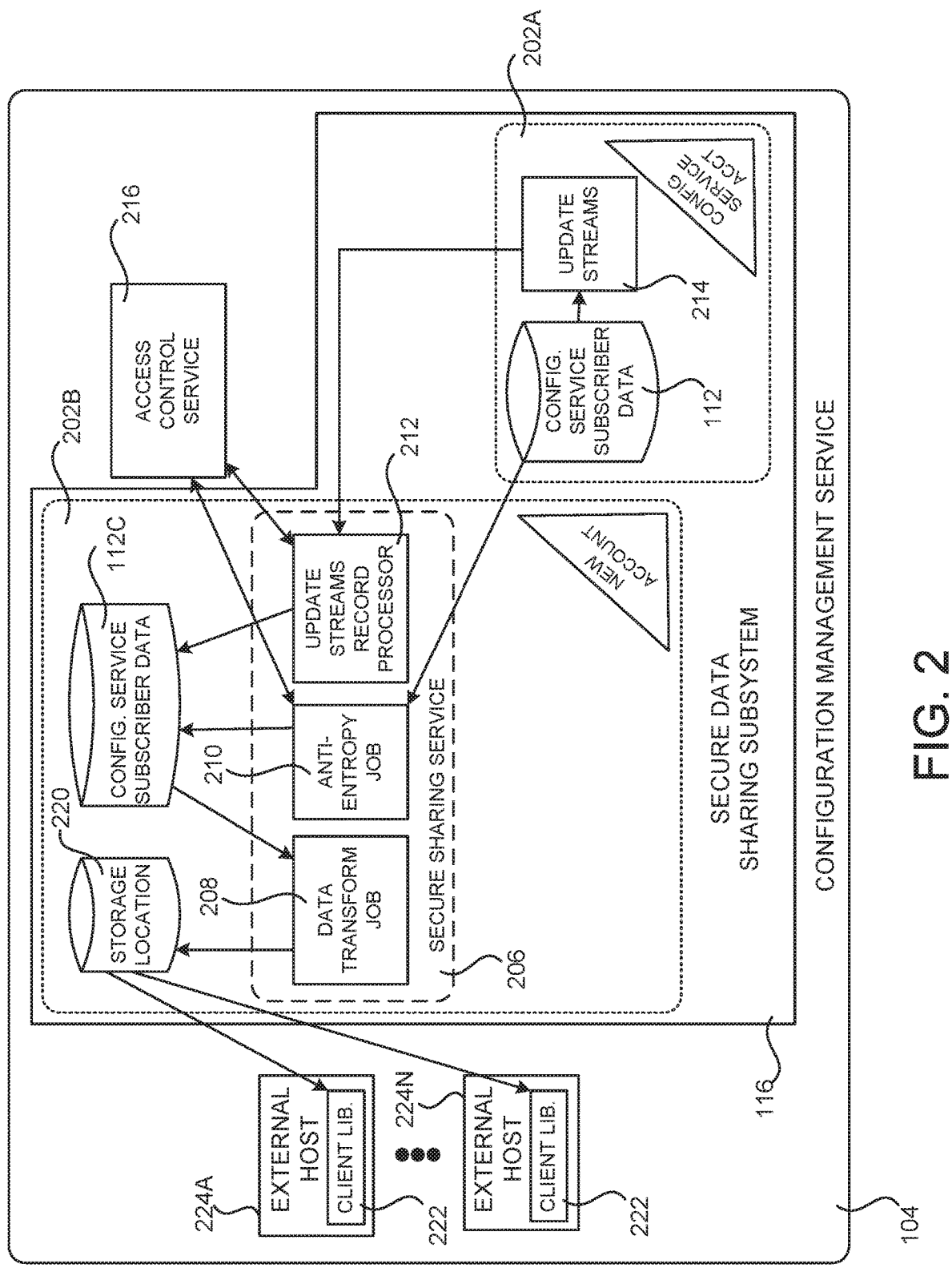
FIG. 2 is a computer software architecture diagram showing aspects of the configuration and operation of a secure data sharing subsystem that forms a part of the configuration management service shown in FIG. 1, according to one particular embodiment.

FIG. 2 is a computer software architecture diagram showing aspects of the configuration and operation of the secure data sharing subsystem 116 (which might be referred to herein as the "subsystem 116") shown in FIG. 1 and described briefly above, according to one particular embodiment. As shown in FIG. 2, the subsystem 116 includes a secure sharing service 206 in one particular embodiment. As discussed briefly above, the secure sharing service 206 securely determines whether each subscriber has authorized producer services 106, which provide resource configuration data 108 to the configuration management service 104 for their computing resources, to share their configuration data with the configuration management service 104. If a subscriber has authorized such sharing by the producer services 106, the secure sharing service 206 can store records of configuration service subscriber data 112 that identify the subscriber in a location accessible to the producer services 106. Additional details regarding this process will be provided below.

In the embodiment shown in FIG. 2, the secure sharing service 206 executes in a service account 202B that is separate from the service account in which the configuration management service 104 itself executes. The dotted lines in FIG. 2 show the boundaries of each service account. In this embodiment, the account 202B has a higher level of security than the account 202A and, therefore, the secure sharing service 206 is more secure than the configuration management service 116. For example, and without limitation, the account 202B might be an account that is internal to the provider of the service provider network 102 and, therefore, may be unknown to users of the service provider network 102. The account 202A executing the configuration management service 104, on the other hand, is configured for handling large volumes of service calls from many network services and, as a result, might be more vulnerable.

In the embodiment shown in FIG. 2, the secure sharing service 206 includes three subcomponents: a data transform job 208, an anti-entropy job 210, and an update streams record processor 212. The anti-entropy job 210 is a software component configured to make a copy of the configuration service subscriber data 112 in the service account 202B. The copy of the configuration service subscriber data 112 is shown in FIG. 2 as configuration service subscriber data 112C. The anti-entropy job 210 also periodically compares the contents of the configuration service subscriber data 112 and the configuration service subscriber data 112C to ensure they are in synchronization. Records contained in the configuration service subscriber data 112 but not in the configuration service subscriber data 112C can be copied to the configuration service subscriber data 112C. Records contained in the configuration service subscriber data 112C but not in the configuration service subscriber data 112 can be deleted from the configuration service subscriber data 112C or otherwise not made accessible to the storage location 220. This synchronization process might be performed periodically such as, for example, every two minutes in one particular configuration.

As shown in FIG. 2, updates to the records of the configuration service subscriber data 112 can be provided to the update streams record processor 212. The update streams record processor 212 is a software component configured to receive the records in the update streams 214 as updates are made to the configuration service subscriber data 112. The records of information contained in the update streams 214 can also be stored with the configuration service subscriber data 112C. In this manner, updates to the configuration service subscriber data 112 are provided to the update streams processor 212 as they are made and the anti-entropy job 210 periodically synchronizes the configuration service subscriber data 112 and the configuration service subscriber data 112C to ensure that their contents are consistent with one another.

As also shown in FIG. 2, the anti-entropy job 210 and the update streams record processor 212 are both configured to determine whether a subscriber of the configuration management service 104 has authorized the producer services 106 to share resource configuration data for their computing resources with the configuration management service. The subscriber might, for example, provide authorization for such sharing by defining a role for the configuration management service 104 with the access control service 216 that delegates their permissions to share the subscriber data 112 to the configuration management service 104.

In this example, the anti-entropy job 210 and the update streams record processor 212 can make network service calls to the access control service 216 for each record of subscriber data 112 that is received to confirm that the associated subscriber has assigned such a role to the configuration management service 104 and that the configuration management service 104 has the permission to assume that role. Other mechanisms can be utilized in other embodiments to authorize the producer services 106 to share the resource configuration data with the configuration management service.

If the anti-entropy job 210 or the update streams record processor 212 determines that a subscriber has authorized the producer services to share their resource configuration data with the configuration management service 10, the anti-entropy job 210 and the update streams record processor 212 will store the subscriber record with the configuration service subscriber data 112C. If, on the other hand, the anti-entropy job 210 or the update streams record processor 212 determines that a subscriber has not authorized the producer services to share resource configuration data for their computing resources with the configuration management service 104, the anti-entropy job 210 and the update streams record processor 212 will not store the subscriber record in the storage location 220 (e.g. by deleting the subscriber record). In this manner, the configuration service subscriber data 112C is ensured to have only subscriber data 112 for subscribers of the configuration management service 104 that have authorized the service 104 to share their subscriber data 112.

As shown in FIG. 2, the data transform job 208 is configured to periodically retrieve the records of the configuration service subscriber data 112C. The data transform job 208 can also perform post-processing on the records of the configuration service subscriber data 112C such as, for example, converting the format of the records of the configuration service subscriber data 112C and/or performing other transformations on the records of the configuration service subscriber data 112C.

Once the records of the configuration service subscriber data 112C have been post-processed, the data transform job 208 stores the records of the configuration service subscriber data 112C in a storage location 220 that is accessible to the producer services 106. For example, and without limitation, the data transform job 208 can store the records of the configuration service subscriber data 112C in a storage location 220 provided by a storage service executing in the service provider network 102. Details regarding the operation of one such storage service will be provided below with regard to FIG. 7.

Once the post-processed records of the configuration service subscriber data 112C have been stored in the storage location 220, the producer services 106 can retrieve the subscriber data 112C. In the example shown in FIG. 2, for instance, a client library 222 executing on an external host computer 224A has retrieved the records of the configuration service subscriber data 112C from the storage location 220 for use by the producer service 106A. Similarly, the client library 222 executing on an external host computer 224N has retrieved the records of the configuration service subscriber data 112C from the storage location 220 for use by the producer service 106N.

The client library 222 is a software library that has been configured for use with the mechanism described above. The client library 222 abstracts the complexity of interacting with the secure data sharing subsystem 116 from the producer services 106. For example, and without limitation, the client library 222 might create a local cache of the records of the configuration service subscriber data 112C. The client library 222 might also expose a network services API through which other services can request a list of subscribers for which resource configuration data 108 is to be provided to the configuration management service 104. The API exposed by the client library 222 can provide other types of functionality in other configurations.

Once the producer services 106 have retrieved the subscriber data 112C from the storage location 220, the producer services 106 can utilize the subscriber data 112C to determine the subscribers for which resource configuration data 108 is to be provided to the configuration management service 104. For example, the producer services 106 can be configured to provide resource configuration data 108 to the configuration management service 104 only for computing resources associated with subscribers that subscribe to both the configuration management service 104 and to the producer services 106. Additional details regarding this process will be provided below with regard to FIGS. 3 and 4.

Figure 3:
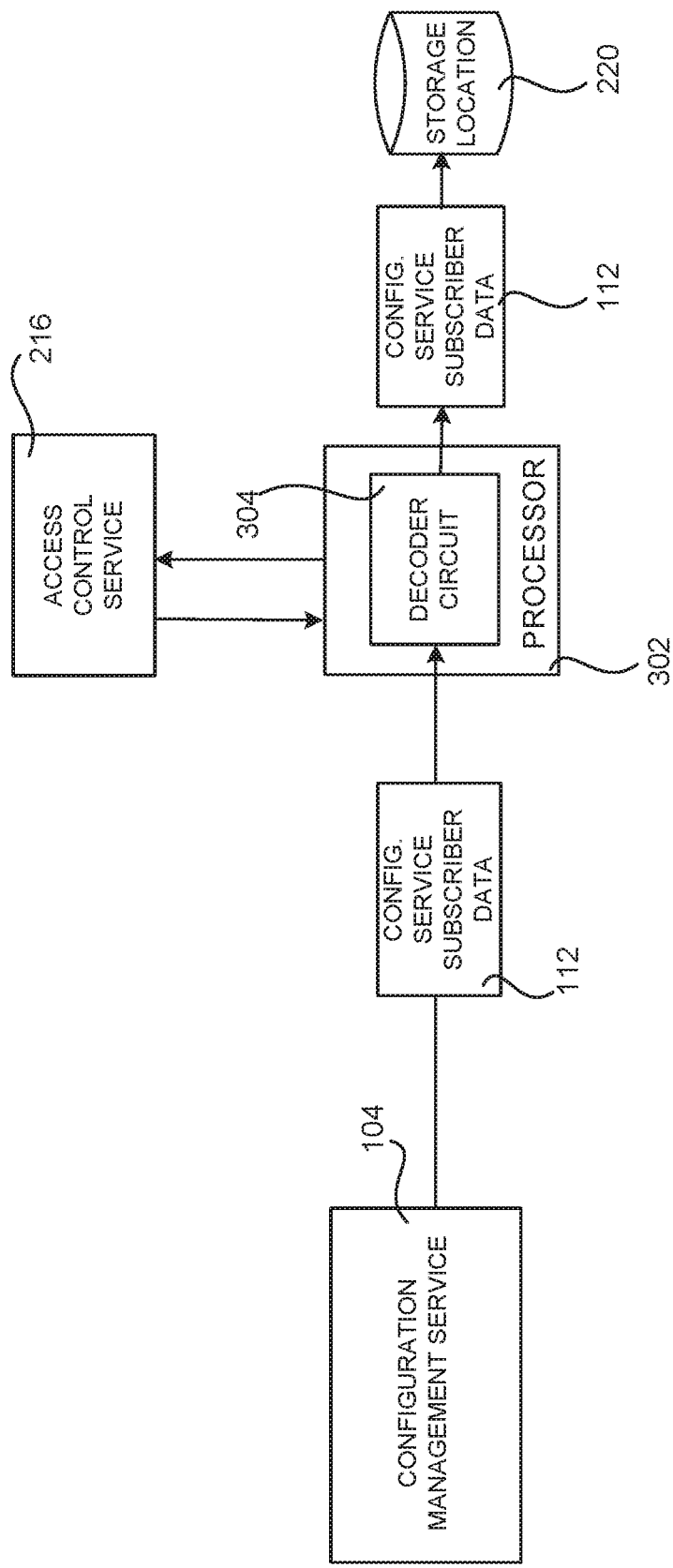
FIG. 3 is a software architecture diagram showing further aspects of the configuration and operation of the secure data sharing subsystem shown in FIGS. 1 and 2 for secure and efficient cross-service sharing of subscriber data, according to one particular.

FIG. 3 is a software architecture diagram showing further aspects of the configuration and operation of the secure data sharing subsystem 116 shown in FIGS. 1 and 2 and described above. As shown in FIG. 3, a processor 302 includes a decoder circuit 304 that is configured to decode instructions to receive configuration service subscriber data 112 from the configuration management service 104. The instructions, when decoded, can also cause the processor 302 to determine whether a subscriber has authorized the configuration management service 104 to share the records of information in the configuration service subscriber data 112 for the subscriber with one or more of the producer services 106. As discussed above with regard to FIG. 2, this is accomplished in one embodiment by consulting the access control service 216.

If the decoded instructions indicate that the subscriber has authorized a producer service 106 to share resource configuration data with the configuration management service 104, the decoded instructions can cause the records of subscriber data 112 to be stored in a storage location 220 accessible to the producer services 106. As discussed above, the producer services 106 can then retrieve the records of subscriber data 112, and utilize the data 112 to provide resource configuration data 108 to the configuration management service 104 only for those subscribers that subscribe to both the configuration management service 104 and to the producer services 106.

The instructions decoded by the decoder circuit 304 can be general purpose instructions or function-specific instructions that perform the functionality described above with regard to FIGS. 1 and 2 and below with regard to FIG. 4. When the decoder circuit 304 is configured to decode function-specific instructions, the decoder circuit 304 can also be configured specific to those instructions in order to decode specific instruction fields included in x86, ARM, MIPS, or other architectures, such as an opcode, one or more data fields (immediate or addresses to data) and the like. Other processor configurations can be utilized to implement the functionality described herein in other embodiments.

Figure 4:
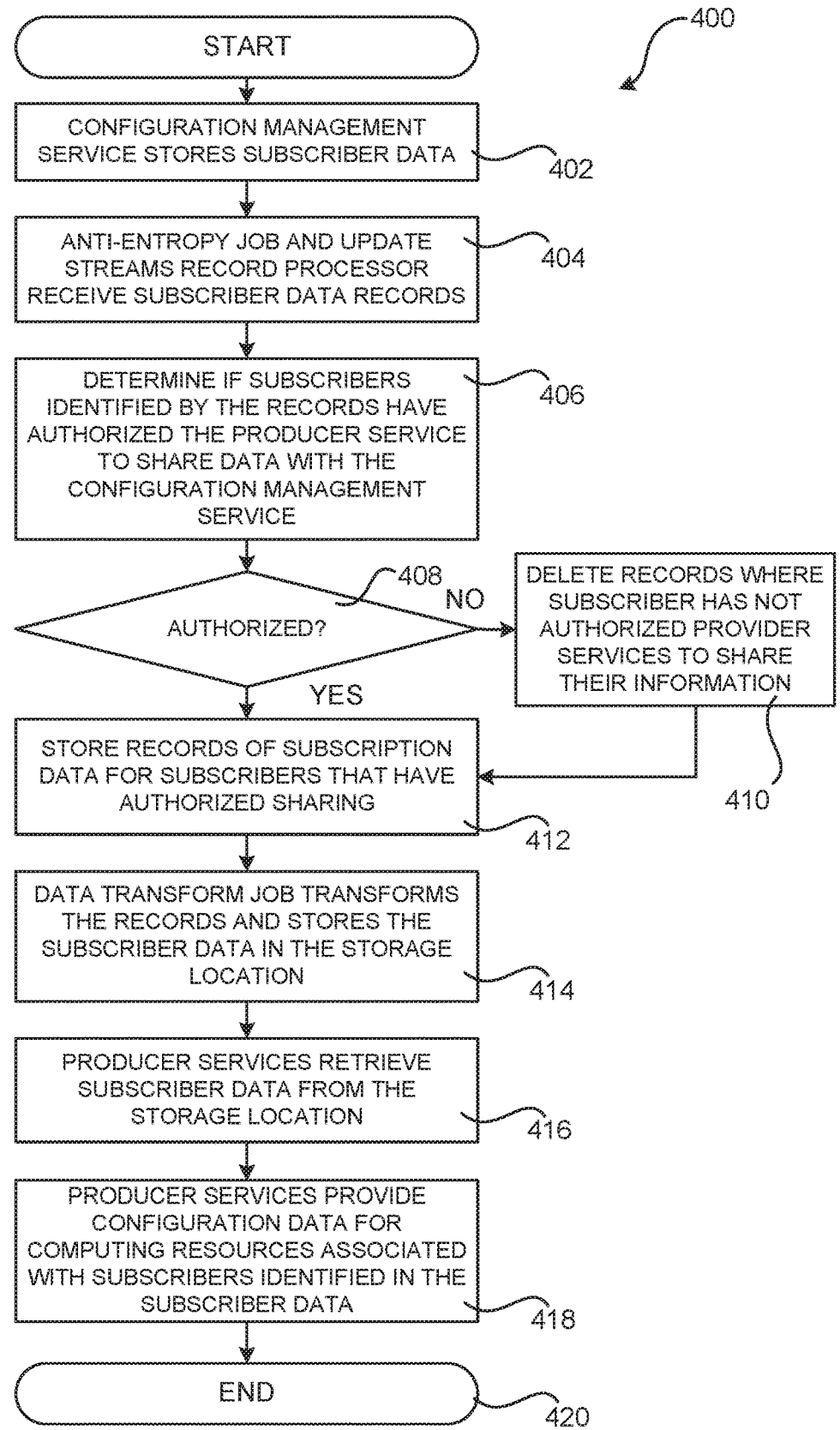
FIG. 4 is a flow diagram showing a routine that illustrates aspects of the operation of the configuration management service and the secure data sharing subsystem shown in FIGS. 1-3, according to one embodiment.

FIG. 4 is a flow diagram showing a routine 400 that illustrates aspects of the operation of the configuration management service 104 and the secure data sharing subsystem 116 shown in FIGS. 1-3 and described above, according to one embodiment. It should be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The routine 400 begins at operation 402, where the configuration management service 104 stores the configuration service subscriber data 112. The routine 400 then proceeds to operation 404, where the anti-entropy job 210 and the update streams record processor 212 receive the records of the subscriber data 112. The routine 400 then proceeds to operation 406, where the anti-entropy job 210 and/or the update streams record processor 212 determines, for each record of the subscriber data 112, whether the subscriber has authorized the producer services 106 to share the corresponding resource configuration data with the configuration management service 102. As discussed above, this can be accomplished by consulting the access control service 216 in some embodiments.

For records of the subscriber data 112 where the subscriber has not authorized the producer services 106 to share with the configuration management service 102, the routine 400 proceeds from operation 408 to operation 410, where the records are deleted from the secure sharing service 206 or otherwise not stored in the storage location 220. For records of the subscriber data 112 where the subscriber has authorized the producer services 106 to share their configuration data, the routine 400 proceeds from operation 408 to operation 412, where the records are stored by the secure sharing service 206 (i.e. the subscriber data 112C).

From operation 412, the routine 400 proceeds to operation 414, where the data transform job 208 transforms the records of the subscriber data 112C in some embodiments. The data transform job 208 also stores the records of the subscriber data 112C, which might been transformed, in the storage location 220, which is accessible to the producer services 106.

From operation 414, the routine 400 proceeds to operation 416, where the producer services 106 retrieve the subscriber data 112C from the storage location 220, such as through the use of the client library 222. The routine 400 then proceeds from operation 416 to operation 418, where the producer services 106 provide resource configuration data 108 to the configuration management service 104 for resources associated with the subscribers identified in the subscriber data 112C. The routine 400 then proceeds from operation 418 to operation 420, where it ends.

Figure 5:
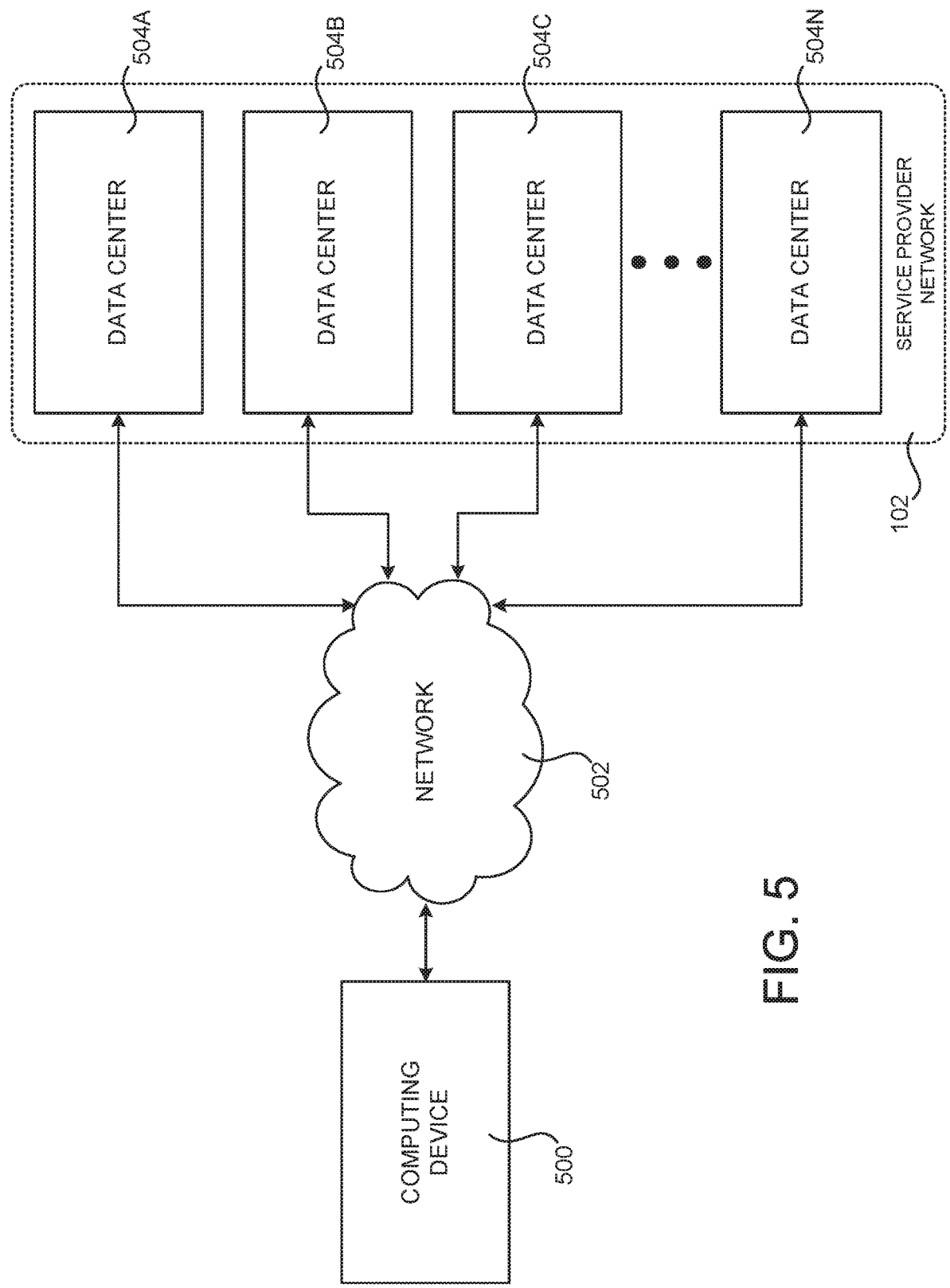
FIG. 5 is a system and network diagram that shows an illustrative operating environment that includes a service provider network that can be configured to implement aspects of the functionality described herein.

FIG. 5 is a system and network diagram that shows one illustrative operating environment for the embodiments disclosed herein that includes a service provider network 102 that can be configured to provide the configuration management service 104 disclosed herein. As discussed above, the service provider network 102 can provide computing resources, like VM instances and storage, on a permanent or an as-needed basis. Among other types of functionality, the computing resources provided by the service provider network 102 can be utilized to implement the various services described above. As also discussed above, the service provider network 102 can provide various types of computing resources, such as data processing resources like VM instances, data storage resources, networking resources, database resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

The customers and other users of the service provider network 102 can access the computing resources provided by the service provider network 102 over a network 502, which can be a wide area communication network ("WAN"), such as the Internet, an intranet or an Internet service provider ("ISP") network or a combination of such networks. For example, and without limitation, a computing device 500 operated by a customer or other user of the service provider network 102 can be utilized to access the service provider network 102 by way of the network 502. It should be appreciated that a local-area network ("LAN"), the Internet, or any other networking topology known in the art that connects the data centers 504 to remote customers and other users can be utilized. It should also be appreciated that combinations of such networks can also be utilized.

Figure 6:
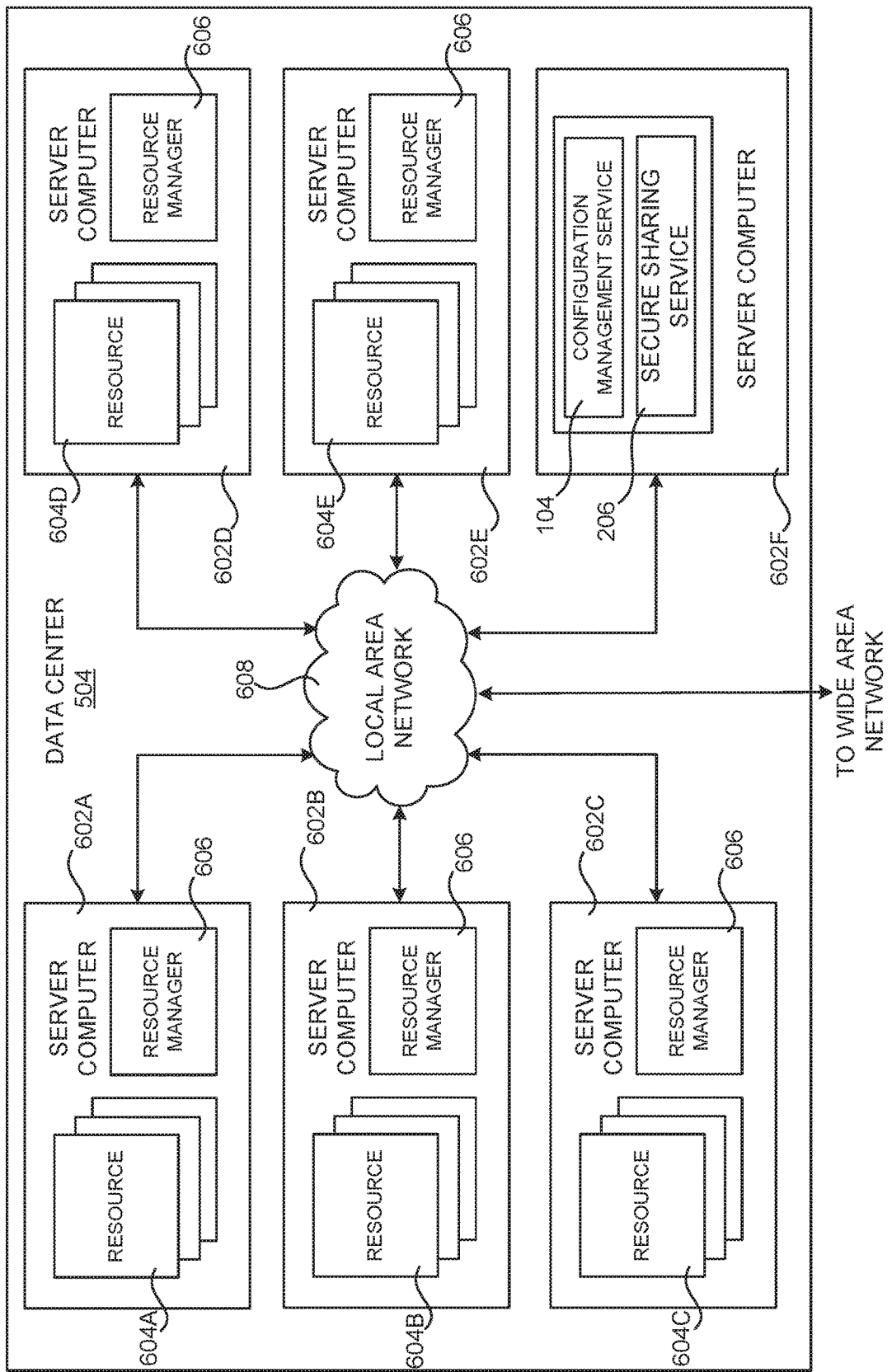
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein for providing the configuration management service 104. The example data center 504 shown in FIG. 6 includes several server computers 602A-602F (which might be referred to herein singularly as "a server computer 602" or in the plural as "the server computers 602") for providing computing resources 604A-604E.

The server computers 602 can be standard tower, rackmount, or blade server computers configured appropriately for providing the computing resources described herein (illustrated in FIG. 6 as the computing resources 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 7.

The data center 604 shown in FIG. 6 also includes a server computer 602F that can execute some or all of the software components described above. For example, and without limitation, the server computer 602F can be configured to execute the configuration management service 104, the secure sharing service 206, and/or the other software components described above. The server computer 602F can also be configured to execute other components and/or to store data for providing some or all of the functionality described herein. In this regard, it should be appreciated that the services illustrated in FIG. 6 as executing on the server computer 602F can execute on many other physical or virtual servers in the data centers 604 in various embodiments.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations can be utilized.

Figure 7:
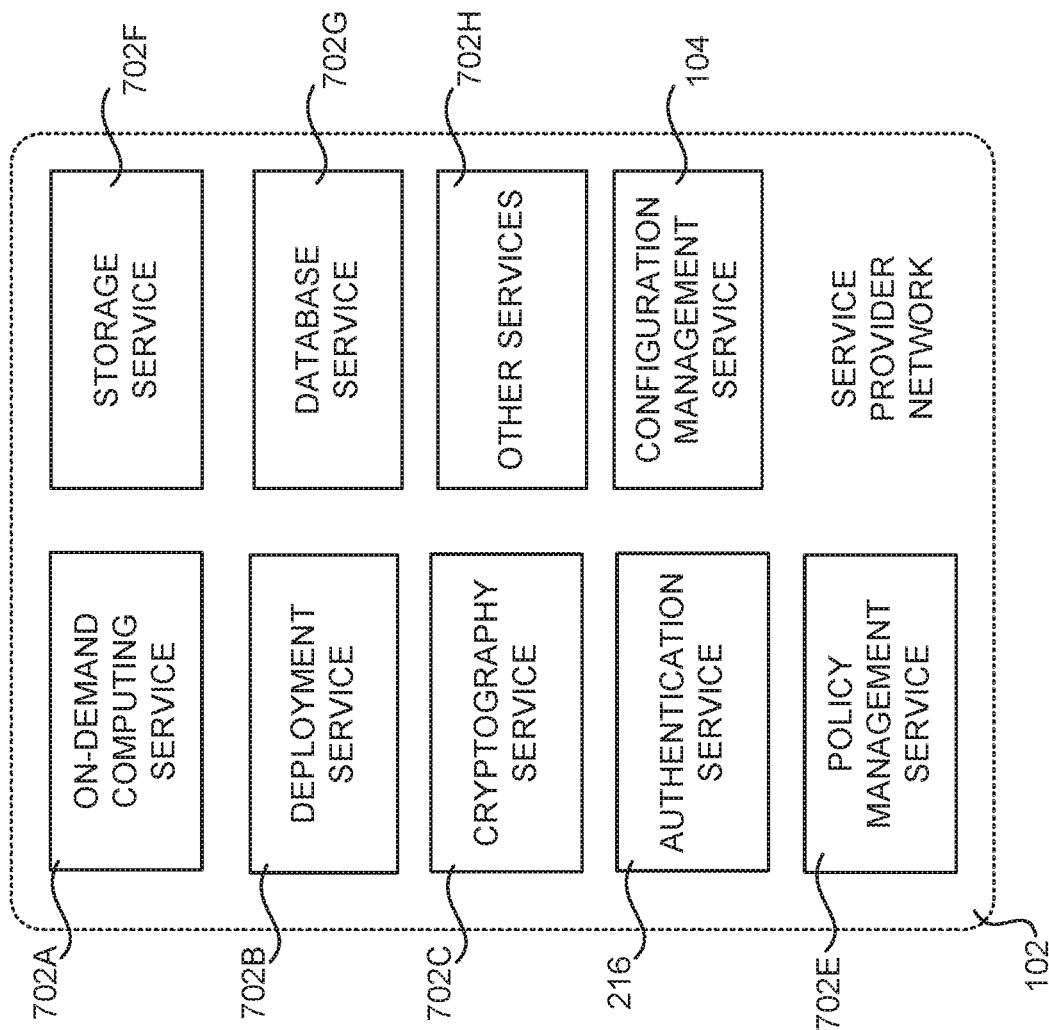
FIG. 7 is a system and network diagram that shows aspects of several services that can be provided by and utilized within a service provider network in one disclosed herein.

FIG. 7 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the configuration management service 104. The service provider network 102 can also provide other types of services including, but not limited to, an on-demand computing service 702A, a deployment service 702B, a cryptography service 702C, the access control service 216, a policy management service 702E, a database service 702G, and/or a storage service 702F, some of which are described in greater detail below. Additionally, the service provider network 102 can also provide other services 702H, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 502 shown in FIG. 5. Communications from a customer computing device, such as the computing device 500 shown in FIG. 5, to the service provider network 102 can cause the services provided by the service provider network 102 to operate in accordance with the described embodiments or variations thereof.

It is noted that not all embodiments described include the services described with reference to FIG. 7 and that additional services can be provided in addition to or as an alternative to services explicitly described. Each of the services shown in FIG. 7 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from the storage service 702F). Additional details regarding some of the services shown in FIG. 7 will now be provided.

As discussed above, the on-demand computing service 702A can be a collection of computing resources configured to instantiate VM instances and to provide other types of computing resources on demand. For example, a customer or other user of the service provider network 102 can interact with the on-demand computing service 702A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 702A is shown in FIG. 7, any other computer system or computer system service can be utilized in the service provider network 102, such as a computer system or computer system service that does not employ virtualization and instead provisions computing resources on dedicated or shared computers/servers and/or other physical devices.

The storage service 702F can include software and computing resources that collectively operate to store data using block or file-level storage devices (and/or virtualizations thereof). The storage devices provided by the storage service 702F can, for instance, be operationally attached to virtual computer systems provided by the on-demand computing service 702A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 702C. The cryptography service 702C can utilize storage services of the service provider network 102, such as the storage service 702A, to store encryption keys in encrypted form, whereby the keys are usable to decrypt customer keys accessible only to particular devices of the cryptography service 702C. The cryptography service 702C can also provide other types of functionality not specifically mentioned herein.

As illustrated in FIG. 7, the service provider network 102, in various embodiments, also includes an access control service 216 and a policy management service 702E. As discussed above, the access control service 216, in one example, is a computer system (i.e., collection of computing resources) configured to perform operations involved in authentication of users. For instance, one of the services 702 shown in FIG. 7 can provide information from a user to the access control service 216 to receive information in return that indicates whether or not the requests submitted by the user are authentic. As also discussed above, the access control service 216 can also provide authorization services, such as providing information indicating whether a user or network service is authorized to perform a particular operation.

The policy management service 702E, in one example, is a network service configured to manage policies on behalf of customers or internal users of the service provider network 102. The policy management service 702E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 702F based, at least in part, on the needs of its customers. For instance, the service provider network 102 can maintain a deployment service 702B for deploying program code and/or a data warehouse service in some embodiments. Other services include object-level archival data storage services, a database service 702G for providing database services, and services that manage, monitor, interact with, or support other services. The service provider network 102 can also be configured with other network services not specifically mentioned herein in other embodiments. Each of the network services shown in FIG. 7 can be a producer service 106.

Figure 8:
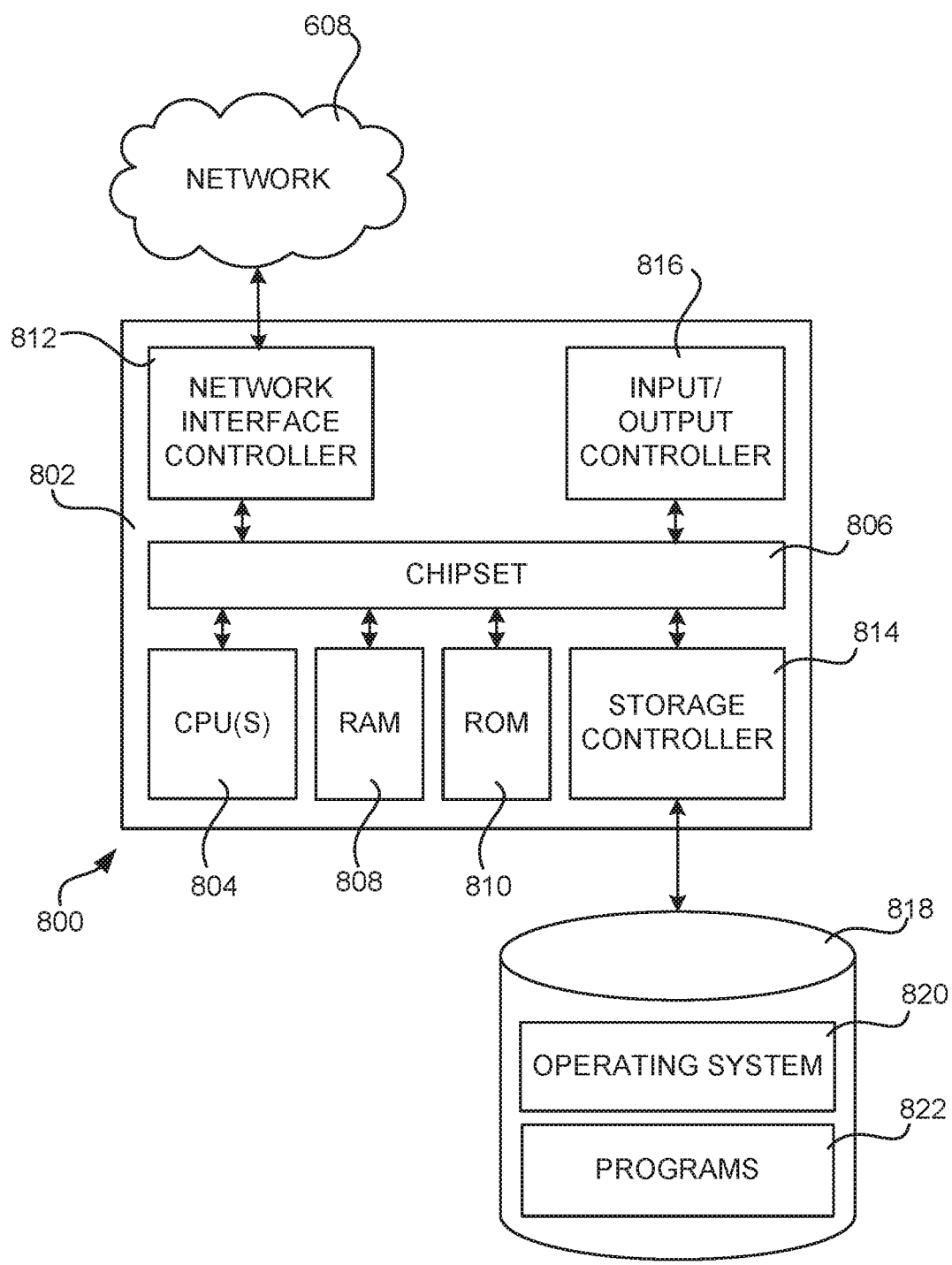
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative embodiment, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the embodiments described herein.

The computer 800 can operate in a networked environment using logical connections to remote computing devices and computer systems through a network, such as the network 608. The chipset 806 can include functionality for providing network connectivity through a NIC 812, such as a gigabit Ethernet adapter. The NIC 812 is capable of connecting the computer 800 to other computing devices over the network 608. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. In one embodiment, the operating system comprises the LINUX operating system. In another embodiment, the operating system comprises the WINDOWS® SERVER operating system from MICROSOFT Corporation of Redmond, Wash. In other embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

Based on the foregoing, it is to be appreciated that technologies for secure and efficient cross-service sharing of subscriber data, and other types of data, have been presented herein. As discussed above, it is also to be appreciated that while the embodiments disclosed herein have been primarily presented in the context of sharing subscriber data between a configuration management service and one or more producer services, the technologies disclosed herein can be utilized to securely share other types of data between other types of services.

Additionally, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. An apparatus, comprising:
   at least one non-transitory computer-readable storage medium to store instructions which, in response to being performed by one or more processors, cause the apparatus to:
      store, by an access control service executing in a service provider network, authorizations for a configuration management service monitoring configurations of distributed computing resources in the service provider network to receive resource configuration data a subscriber of the configuration management service;
      provide at least one record of information from a first account of the configuration management service to a first network service executing by way of a second account, wherein the at least one record of information is to indicate the subscriber;
      determine, by the first network service and from the access control service, whether the subscriber has authorized a second network service to share the resource configuration data for the subscriber indicated by the at least one record of information with the configuration management service, wherein the second network service is a provider of the resource configuration data for the subscriber, and wherein the first network service has a higher level of security than the configuration management service and is secure from access at least by the second network service; and
      in response to determining that the subscriber has authorized the second network service to share the resource configuration data for the subscriber with the configuration management service, store the at least one record of information in a storage location accessible to the second network service, but that is inaccessible to other network services that are different than the first network service, the configuration management service, and the access control service.

2. The apparatus of claim 1, wherein the at least one record of information is not stored in the storage location in response to determining that the subscriber has not authorized the second network service to share the at least one record of information with the configuration management service.

3. The apparatus of claim 2, the non-transitory computer-readable storage medium for storing further instructions to:
   provide other records from the first account to the second account indicating other subscribers of the configuration management service;
   identify, by the first network service and from the access control service, second authorizations by the other subscribers for the second network service to share the resource configuration data for the other subscribers with the configuration management service; and
   in response to the second authorizations, store the other records in respective storage locations accessible by the second network service.

4. The apparatus of claim 1, the non-transitory computer-readable storage medium for storing further instructions to perform post-processing on the at least one record of information prior to storing the at least one record of information in the storage location accessible to the second network service.

5. The apparatus of claim 1, the non-transitory computer-readable storage medium for storing further instructions to:
   in response to the storing the at least one record of information in the storage location, receive the resource configuration data from the second network service.

6. The apparatus of claim 3, the non-transitory computer-readable storage medium for storing further instructions to:
   synchronize periodically the other records between the first account and the second account.

7. The apparatus of claim 5, wherein the resource configuration data describes a configuration of one or more computing resources executing in the service provider network that are associated with the subscriber.

8. A system, comprising:
   a first network service to maintain data comprising at least one record of information identifying a subscriber of the first network service, the first network service operating in conjunction with a first account, wherein the first network service is a configuration management service to monitor configurations of distributed computing resources in a service provider network;
a second network service operating in conjunction with a second account to receive the at least one record of information from the first network service;
an access control service, residing within the service provider network, to maintain authorizations by subscribers of the configurations management service for a third network service to provide resource configuration data of the subscribers to the first network service; and
one or more processors to:
    determine, by the first network service and from an access control service, whether the subscriber has authorized the third network service to share the resource configuration data for the subscriber indicated by the at least one record of information with the first network service, wherein the third network service is a provider of the resource configuration data for the subscriber, and wherein the second network service has a higher level of security than the first network service and is secure from access at least by the third network service; and
    in response to determining that the subscriber has authorized the third network service to share the resource configuration data for the subscriber with the first network service, cause the at least one record of information to be stored in a storage location that is accessible to the third network service, but that is inaccessible to other network services that are different than the first network service, the configuration management service, and the access control service.

9. The system of claim 8, wherein the at least one record of information is not stored in the storage location in response to determining that the subscriber has not authorized the third network service to share the at least one record of information with the first network service.

10. The system of claim 8, the one or more processors further to:
    provide other records from the first account to the second account indicating other subscribers of the configuration management service;
    identify, by the first network service and from the access control service, second authorizations by the other subscribers for the third network service to share the resource configuration data for the other subscribers with the configuration management service; and
    in response to the second authorizations, store the other records in respective storage locations accessible by the second network service.

11. The system of claim 8, the one or more processors to further perform post-processing on the at least one record of information prior to causing the at least one record of information to be stored in the storage location accessible to the third network service.

12. The system of claim 8, the one or more processors further to:
    in response to storing the at least one record of information in the storage location, receive the resource configuration data from the third network service.

13. The system of claim 12, wherein the at least one record of information is retrieved periodically from the storage location by a client library configured to expose the at least one record of information.

14. The system of claim 12, wherein the resource configuration data describes a configuration of one or more computing resources executing in a service provider network that are associated with the subscriber.

15. A computer-implemented method, comprising:
    receiving at least one record of information at a first network service operating in association with a first account, the at least one record of information identifying a subscriber of a second network service operating in association with a second account, the second network service being a configuration management service monitoring configurations of distributed computing resources in a service provider network, an access control service executing in the service provider network storing authorizations for the configuration management service to receive resource configuration data for subscribers of the configuration management service;
    determining, by the first network service and from the access control service executing in the service provider network, whether the subscriber has authorized sharing of the resource configuration data for the subscriber indicated by the at least one record of information to the second network service from a third network service operating as a provider of the resource configuration data for the subscriber, wherein the first account has a higher level of security than the second account and is secure from access at least by the third network service; and
    in response to determining that the subscriber has authorized sharing of the at least one record of information to the second network service from the third network service, storing the at least one record of information in a storage location that is accessible to the third network service, but that is inaccessible to other network services that are different than the first network service, the configuration management service, and the access control service.

16. The computer-implemented method of claim 15, further comprising:
    deleting the at least one record of information in response to determining that the subscriber has not authorized sharing the at least one record of information to the second network service from the third network service.

17. The computer-implemented method of claim 15, further comprising:
    providing other records from the second account to the first account indicating other subscribers of the configuration management service;
    identifying, by the first network service and from the access control service, second authorizations by the other subscribers for the third network service to share the resource configuration data for the other subscribers with the configuration management service; and
    in response to the second authorizations, storing the other records in respective storage locations accessible by the third network service.

18. The computer-implemented method of claim 15, further comprising:
    performing one or more post-processing operations on the at least one record of information prior to storing the at least one record of information in the storage location accessible to the third network service.

19. The computer-implemented method of claim 15, further comprising:
    in response to the storing the at least one record of information in the storage location, receiving the resource configuration data for the subscriber indicated by the at least one record of information from the third network service to the second network service.

20. The computer-implemented method of claim 17, further comprising:

synchronizing periodically the other records between the first account and the second account.

* * * * *